United States Patent
Dye et al.

(10) Patent No.: US 6,214,090 B1
(45) Date of Patent: Apr. 10, 2001

(54) THERMALLY TOLERANT MULTILAYER METAL MEMBRANE

(75) Inventors: Robert C. Dye; Ronny C. Snow, both of Los Alamos, NM (US)

(73) Assignee: The Regents of the University of California, Los Alamo, NM (US)

( * ) Notice: Subject to any disclaimer, the term of this patent is extended or adjusted under 35 U.S.C. 154(b) by 0 days.

(21) Appl. No.: 09/336,263

(22) Filed: Jun. 18, 1999

(51) Int. Cl.[7] ....................................... B01D 53/22
(52) U.S. Cl. ..................... 95/56; 96/11; 55/524; 55/DIG. 5
(58) Field of Search ..................... 95/55, 56; 96/4, 96/11; 55/524, DIG. 5, 525

(56) References Cited

U.S. PATENT DOCUMENTS

| | | | |
|---|---|---|---|
| 2,958,391 | * 11/1960 | de Rosset | 96/11 X |
| 3,350,846 | * 11/1967 | Makrides et al. | 95/56 |
| 3,428,476 | * 2/1969 | Langley et al. | 96/11 X |
| 5,139,541 | * 8/1992 | Edlund | 96/11 X |
| 5,217,506 | * 6/1993 | Edlund et al. | 95/56 |
| 5,259,870 | * 11/1993 | Edlund | 95/56 |
| 5,393,325 | * 2/1995 | Edlund | 95/56 |
| 5,498,278 | * 3/1996 | Edlund | 96/11 |
| 5,614,001 | 3/1997 | Kosaka et al. | 96/10 |
| 5,645,626 | 7/1997 | Edlund et al. | 95/56 |
| 5,738,708 | 4/1998 | Peachy et al. | 95/56 |
| 5,782,959 | 7/1998 | Yang et al. | 96/11 |

FOREIGN PATENT DOCUMENTS

| | | | |
|---|---|---|---|
| 1292025 | * 10/1972 | (GB) | 95/56 |

OTHER PUBLICATIONS

Peachy et al., "Composite Pd/Ta Metal Membranes for Hydrogen Separation", Journal of Membrane Science, vol. 11, pp. 123–133 (1996).

Ali et al., "Deactivation and Regeneration of Pd–Ag Membranes for Dehydrogenation Reaticons", Journal of Membrane Science, vol. 89, pp. 171–184, (1998).

Ali et al., "Irreversible Poisoning of Pd–Ag Membranes", Int. J. Hydrogen Energy, vol. 19, No. 11, pp. 877–880, (1994).

Shu et al., "Catalytic Palladium–Based Membrane Reactors: A Review", The Canadian Journal of Chemical Engineering, vol. 69, pp. 1036–1060, (Oct. 1991).

Moss et al., "Multilayer Metal Membranes for Hydrogen Separation", Int. J. Hydrogen Energy, vol. 23, No. 3, pp. 99–106, (1998).

\* cited by examiner

*Primary Examiner*—Robert H. Spitzer
(74) *Attorney, Agent, or Firm*—Bruce H. Cottrell

(57) ABSTRACT

A composite metal membrane including a first metal layer of a Group IVB or Group VB metal sandwiched between two layers of a Group VIIIB metal selected from the group consisting of palladium, platinum, nickel, rhodium, iridium, cobalt, and alloys thereof, and a non-continuous layer of a metal chalcogenide upon one layer of the Group VIIIB metal is disclosed together with a process for the recovery of hydrogen from a gaseous mixture using such a composite membrane and a process for forming such a composite metal membrane.

19 Claims, 2 Drawing Sheets

THERMALLY TOLERANT MULTILAYER METAL MEMBRANE

This invention was made with government support under Contract No. W-7405-ENG-36 awarded by the U.S. Department of Energy. The government has certain rights in the invention.

FIELD OF THE INVENTION

The present invention relates to hydrogen-permeable membranes and in particular to a composite multilayer metal membrane for purification of hydrogen or its separation from a mixture of gases by diffusion through the membrane. Additionally, this invention relates to a method of separating hydrogen in a substantially pure form by use of the composite multilayer metal membrane that is permeable only to hydrogen.

BACKGROUND OF THE INVENTION

There are a variety of needs for essentially pure hydrogen. Included among these are fuel cells, membrane reactors and fuel reforming operations. As a result there is a strong interest in economical methods for hydrogen separation.

Composite multilayer metal membranes are known for the separation of hydrogen from gaseous mixtures. For example, U.S. Pat. No. 3,350,846 (Makrides et al.) describes separation of hydrogen by permeation through multilayer metal membranes including a Group VB metal sandwiched between two layers of palladium. In U.S. Pat. No. 5,149,420, Buxbaum et al. describe a method for plating palladium onto Group IVB or VB metals to form articles useful for hydrogen separation. U.S. Pat. No. 5,393,325 (Edlund) describes a composite hydrogen separation multilayer metal membrane, as does U.S. Pat. No. 5,738,708 (Peachey et al.).

In some applications of such composite multilayer metal membranes, improved operation at higher temperatures is desirable. Additionally, the catalytic metal layer can often be susceptible to poisoning from species in the feed stream such as, e.g., sulfur and chlorine. Accordingly, despite all of the previous work in the development of composite multilayer metal membranes for hydrogen separation, improvements have been continually sought to improve high temperature efficiency and to reduce susceptibility to poisoning.

It is an object of this invention to provide a composite multilayer metal membrane capable of separating hydrogen or its isotopes by selective diffusion through the membrane and more preferably essentially pure hydrogen or its isotopes, the composite multilayer metal membrane having improved high temperature efficiency.

It is another object of this invention to provide a composite multilayer metal membrane capable of separating hydrogen or its isotopes by selective diffusion through the membrane and more preferably essentially pure hydrogen or its isotopes, the composite multilayer metal membrane having reduced susceptibility to poisoning.

Still another object of the present invention is a process of forming a composite multilayer metal membrane for subsequent separation of essentially pure hydrogen by selective diffusion through the membrane.

SUMMARY OF THE INVENTION

To achieve the foregoing and other objects, and in accordance with the purposes of the present invention, as embodied and broadly described herein, a composite multilayer metal membrane is provided including a layer of a Group IVB or Group VB metal sandwiched between two layers of a Group VIIIB metal selected from the group consisting of palladium, platinum, nickel, rhodium, iridium, cobalt, and alloys thereof, and a non-continuous layer of a metal chalcogenide upon at least one layer of said Group VIIIB metal. In another embodiment of the present invention, an overlayer of a Group VIIIB metal selected from the group consisting of palladium, platinum, nickel, rhodium, iridium, cobalt, and alloys thereof is situated on composite metal membrane surfaces including the layer of a non-continuous layer of a metal chalcogenide.

The present invention further provides a process for the recovery of hydrogen from a gaseous mixture including contacting a hydrogen-containing gaseous mixture with a first side of a composite multilayer metal membrane including a layer of a Group IVB or Group VB metal sandwiched between two layers of a Group VIIIB metal selected from the group consisting of palladium, platinum, nickel, rhodium, iridium, cobalt, and alloys thereof and a non-continuous layer of a metal chalcogenide upon at least one layer of said Group VIIIB metal, and, separating hydrogen from a second side of said composite multilayer metal membrane. In another embodiment, an overlayer of a Group VIIIB metal selected from the group consisting of palladium, platinum, nickel, rhodium, iridium, cobalt, and alloys thereof is situated on composite metal membrane surfaces including the layer of a non-continuous layer of a metal chalcogenide.

The present invention still further provides a process of forming a composite metal membrane including cleaning a metal film selected from the group consisting of Group IVB metals and Group VB metals to remove surface oxides and surface imperfections from the metal film, depositing layers of a metal selected from the group consisting of palladium, platinum, nickel, rhodium, iridium, cobalt, and alloys thereof upon the cleaned surfaces of the Group IVB or Group VB metal film, and, depositing a non-continuous layer of a metal chalcogenide upon at least one layer of said Group VIIIB metal. In another embodiment of the present invention, an overlayer of a Group VIIIB metal selected from the group consisting of palladium, platinum, nickel, rhodium, iridium, cobalt, and alloys thereof is deposited over composite metal membrane surfaces including the layer of a non-continuous layer of a metal chalcogenide.

DETAILED DESCRIPTION

Figure 1:
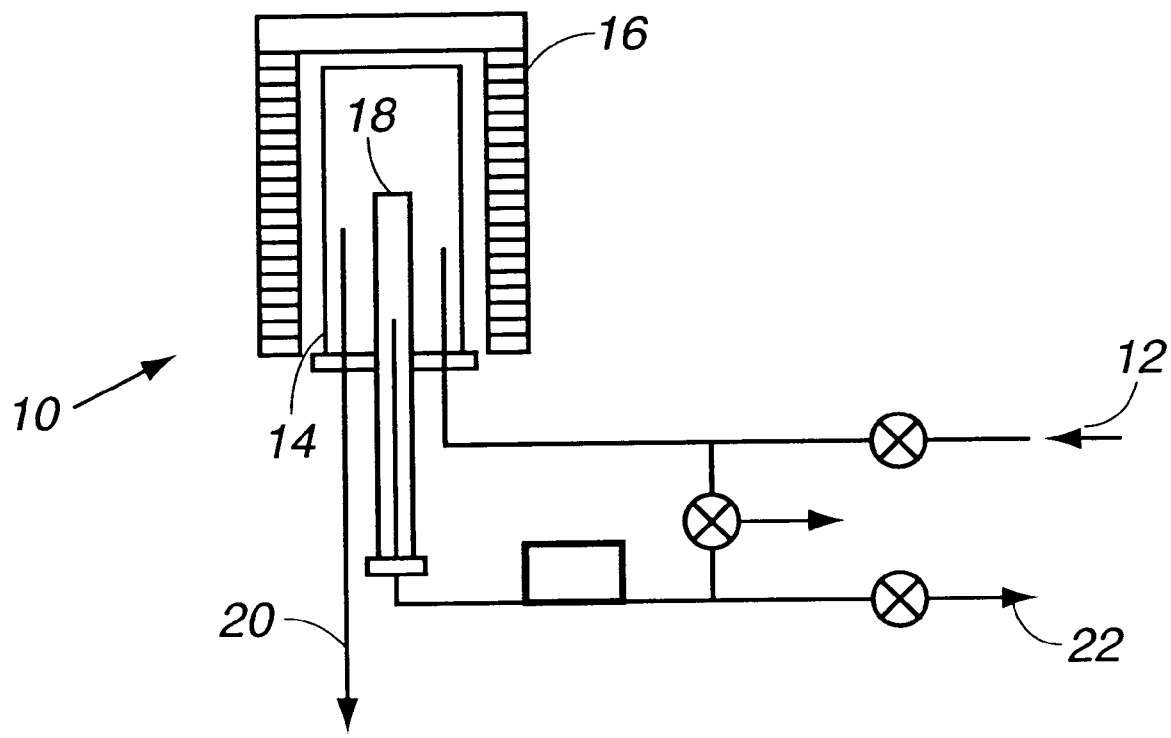
FIG. 1 shows a schematic diagram of a gas separation apparatus used with the present invention.

The present invention is concerned with composite multilayer metal membranes for hydrogen separation. As in many prior composite multilayer metal membranes, the present membranes include a layer of a Group IVB or Group VB metal sandwiched between two layers of a Group VIIIB metal selected from the group consisting of palladium, platinum, nickel, rhodium, iridium, cobalt, and alloys thereof. In one aspect of the present invention a non-continuous layer of a metal chalcogenide is included upon at least one layer of said Group VIIIB metal. In one embodiment, the non-continuous layer of a metal chalcogenide is included upon the layer of said Group VIIIB metal that will be situated on the feed side of a gas separation apparatus. In another embodiment, the non-continuous layer of a metal chalcogenide is included upon both the layer of said Group VIIIB metal that will be situated on the feed side of a gas separation apparatus and on the permeate side of a gas separation apparatus. An additional layer of a Group VIIIB metal selected from the group consisting of palladium, platinum, nickel, rhodium, iridium, cobalt, and alloys thereof can be situated over composite metal membrane surfaces including the non-continuous layer of a metal chalcogenide.

The composite multilayer membrane of the present invention includes a core or central metal layer sandwiched between layers of a catalytic metal. The central or core metal can generally be of Group IVB metals and Group VB metals such as vanadium, niobium, tantalum, titanium, and zirconium. The central metal of the membrane may also be of a metal from Groups IB, IIIB, VIIB or VIIIB of the periodic table. Preferably, the central or core metal is vanadium, niobium or tantalum. The central or core metal can also be an alloy of, e.g., one or more Group IVB or Group VB metals or one or more Group IVB or Group VB metals and other metals such as gold, silver and copper. Generally, the central or core metal has a defined orientation or crystal structure, e.g., a (100), (010), or (001) orientation.

The composite multilayer membrane of the present invention is characterized as non-porous, i.e., there are no channels or passages that extend through the membrane for passage of gas molecules or the like.

In one aspect of forming the composite membrane of the present invention, the central metal film is initially cleaned to remove any surface oxidation or contamination or other surface imperfections. Cleaning can be done, e.g., by an ion milling process under vacuum. The ion milling process can be conducted in a suitable vacuum chamber evacuated to at least about $10^{-3}$ Torr, preferably at least about $10^{-6}$ Torr. The ion used for the ion milling can be, e.g., argon, neon, or helium. Cleaning can also be done by scrubbing with a soap or detergent such as Alkanox where the surface is rubbed with the soap for a few minutes, rinsed with deionized water and dried, preferably by placing in a suitable vacuum chamber evacuated to at least about $10^{-3}$ Torr to remove remaining traces of water.

Catalytic metal layers are then deposited upon the surfaces of the central metal film such that a three layer sandwich is formed with the central metal film coated on its oppositely situated surfaces with a layer of the catalytic metal. The catalytic metal can generally be selected from among palladium, platinum, nickel, iridium, rhodium and cobalt, preferably from among palladium, platinum, nickel, iridium, and rhodium. Alloys of the catalytic metal can also be employed wherein such alloys further include one or more other metal such as silver, gold, copper, yttrium, and cerium in amounts of from about 1 to about 50 percent by weight based on the total weight of the metals in the alloy. Alloys may allow the composite multilayer metal membrane to separate hydrogen from a gaseous mixture at higher temperatures than with the use of pure palladium or platinum metal.

The catalytic metal layers can be deposited, e.g., by pulsed laser deposition or by methods such as evaporation including coevaporation and e-beam evaporation, and sputtering including magnetron sputtering, ion beam sputtering and ion assisted sputtering. Generally, e-beam evaporation and ion beam sputtering are preferred with e-beam evaporation being more preferred as it provides a faster rate. Any other suitable deposition technique may also be employed.

Generally, deposition steps used in the present invention are conducted under vacuum and preferably are conducted within the same vacuum chamber as that wherein the central metal is cleaned. Preferably, the deposition is carried out immediately after the cleaning or ion milling without removal of the central metal film from the vacuum environment.

As the catalytic metal layers generally are the limiting factor in hydrogen permeation through the composite multilayer metal membrane, the central metal layer can be made thicker so as to increase the structural stability of the composite multilayer metal membrane without reducing hydrogen gas flux. Alternatively, the thickness of the catalytic metal coatings can be reduced to increase hydrogen flux. Generally, the central metal layer can be from about 10 microns to about 250 microns although a thicker layer may be used if desired for structural stability. The catalytic metal coatings layer can generally be from about 0.01 micron to about 25 microns, preferably from about 0.1 micron to about 1 micron in thickness. It can be preferred to have the catalytic metal layer thicker on the side of the membrane adjacent to the feed stream (referred to as the front side) and to have the catalytic metal layer thinner on the side of the membrane opposite to the feed stream (referred to as the exit side). This should reduce the possibility that the hydrogen will exit the composite metal membrane slower than it enters the composite metal membrane from the feed stream.

In the present invention a metal chalcogenide layer is present on one layer of Group VIIIB metal or catalytic metal layer. This metal chalcogenide layer is a non-continuous layer on the Group VIIIB metal or catalytic metal layer. Such a metal chalcogenide layer may reduce interdiffusion between the catalytic metal and the central metal at the operating temperatures of the composite multilayer metal membrane. Among the materials that can serve as the metal chalcogenide layer are oxide materials such as silicon dioxide ($SiO_2$), aluminum oxide ($Al_2O_3$), molybdenum dioxide ($MoO_2$), tungsten oxide ($WO_2$), lanthanum oxide ($La_2O_3$), yttrium oxide ($Y_2O_3$), and yttria-stabilized zirconium oxide (YSZ), sulfide materials such as molybdenum disulfide ($MoS_2$), tungsten disulfide ($WS_2$), and vanadium sulfide ($V_2S_5$), and selenide materials such as molybdenum diselenide ($MoSe_2$), and tungsten diselenide ($WSe_2$).

The metal chalcogenide layer can be deposited in the same manner as the catalytic metal layer and is deposited under vacuum in sequence with the cleaning of the central metal and deposition of the catalytic metal layers. Other methods of forming the metal chalcogenide layer may also be employed. Preferably, the metal chalcogenide layers are deposited or formed with an orientation having structural compatibility with the catalytic metal layers. Generally, while the metal chalcogenide layer is non-continuous, the portions of the metal chalcogenide layer can be from about 20 Angstroms to about 1000 Angstroms in thickness.

In one embodiment of the present invention, an additonal layer of catalytic metal is deposited over the non-continuous layer of metal chalcogenide. Such a layer can be a thin layer of as little as about 100 Angstroms up to about 1000 Angstroms. This layer may not need to be a continuous layer, but it is considered desirable to cover the majority of the metal chalcogenide layer to avoid reduction of the metal chalcogenide to the metal.

In the operation of the composite multilayer metal membrane of the present invention to separate hydrogen, a hydrogen-containing gas stream is contacted with the side of the membrane including the non-continuous layer of the metal chalcogenide whereat at least some of the hydrogen passes through the membrane and is separated as a permeate stream of hydrogen, preferably essentially pure hydrogen. By the term "essentially pure" is meant that the molar amounts of hydrogen in the permeate stream are at least three orders of magnitude greater than molar amounts of any other gas collected in the permeate stream. A sweep gas, i.e., any other gas than hydrogen, may optionally be employed on the permeate side of the composite multilayer metal membrane where essentially pure hydrogen is not sought.

The membrane and process of the present invention can be generally operated at temperatures of from about 80° C. to about 700° C., preferably from about 400° C. to about 600° C., and at pressures from about a few millitorr to about 10 atmospheres or more. The membranes of the present invention including the non-continuous layer of the metal chalcogenide have been found to have longer lifetimes and greater hydrogen fluxes at temperatures above 400° C. than composite multilayer metal membranes without the non-continuous layer of the metal chalcogenide.

The present invention is more particularly described in the following examples which are intended as illustrative only, since numerous modifications and variations will be apparent to those skilled in the art.

EXAMPLE 1

Vanadium foils were cleaned by scrubbing with a detergent (Alkanox), rinsing with deionized water and drying in a vacuum chamber. The initial foil thickness was 40 µm. The cleaned foils were then coated (on both sides) with 0.1 µm (1000 Angstroms) of 99.9% pure palladium using metal evaporation. A non-continuous layer of alumina ($Al_2O_3$) was then deposited upon a single side of the palladium coated vanadium foil. To obtain the non-continuous coating of alumina, the shutter on the deposition system was opened and then immediately shut. The vanadium foils were kept at ambient temperature during both the cleaning and deposition processes. The resultant composite metal membrane was then tested for hydrogen permeability. The results are shown as line 30 in FIG. 2.

EXAMPLE 2

A membrane was prepared as in Example 1 with the exception that the palladium layers adjacent to the vanadium were about 900 Angstroms in thickness. Thereafter, an additional layer of palladium (100 Angstroms) was coated over the non-continuous layer of alumina. The overcoat was of 99.9% pure palladium using metal evaporation. The resultant composite metal membrane was then tested for hydrogen permeability. The results are shown as line 40 in FIG. 2.

Comparative Example

Vanadium foils were cleaned by scrubbing with a detergent (Alkanox), rinsing with deionized water and drying in a vacuum chamber. The initial foil thickness was 40 µm. The cleaned foils were then coated (on both sides) with 0.1 µm of 99.9% pure palladium using metal evaporation. The vanadium foils were kept at ambient temperature during both the cleaning and deposition processes. The resultant composite metal membrane was then tested for hydrogen permeability. The results are shown as line 50 in FIG. 2.

The test system for evaluating the characteristics of the composite multilayer metal membranes is shown in FIG. 1. Feed gas stream 12 enters apparatus 10 into chamber 14. Heater 16 surrounds the chamber. Composite metal membrane 18 separates the feed gas side of the membrane from the permeate side of the membrane and feed gas passes out at feed gas exit 20 as permeate gas 22 is recovered for analysis. The composite metal membranes were mounted in a flange and pressed between two gaskets exposing an area of about 1 $cm_2$. Prior to testing, the mounted membranes were held in a vacuum at 400° C. for at least 24 hours. While this did not appear to change the hydrogen flux significantly, it did increase the longevity of the membranes. Pure hydrogen was used as the test gas. A residual gas analyzer was used to monitor the gas composition in the permeate stream. Leaks could be detected by observing the presence of significant argon gas content. A seal was considered to be leak-free if the argon signal from the gas analyzer was 3 to 4 orders of magnitude less than the hydrogen. No sweep gas was used on the permeate side and the hydrogen fluxes were measured using appropriately sized mass flow meters (from MKS Instruments). The mass flow meters were calibrated to nitrogen gas and the hydrogen fluxes maintained below half of the metering capacity as the manufacturer of the gas flow meter confirmed that in this regime, the scaling factor is essentially unity. The feed gas pressure for the measurements was maintained between 700 and 760 Torr, while the permeate pressure remained below 45 Torr.

Figure 2:
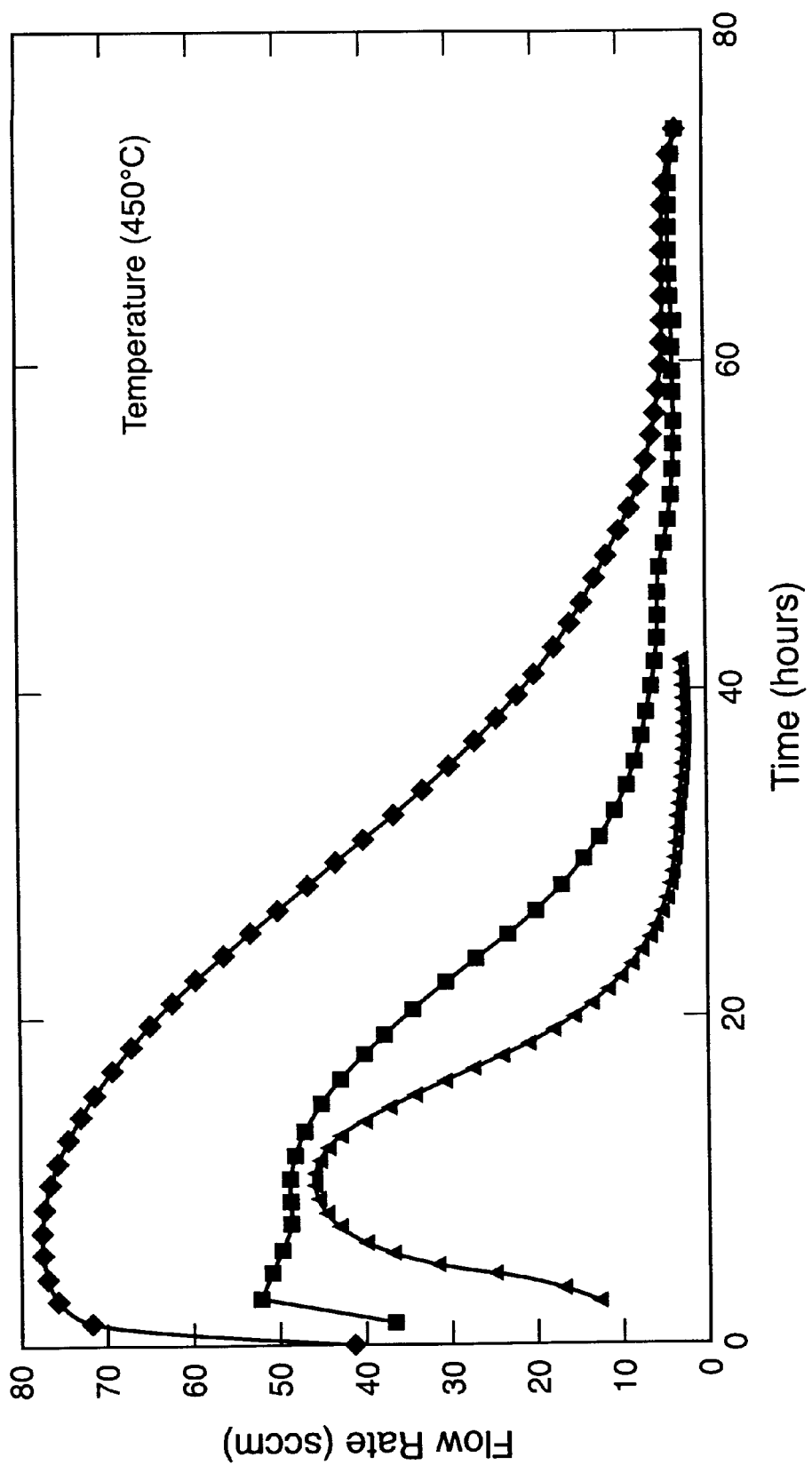
FIG. 2 shows a graph illustrating hydrogen flow (flux) data through the composite multilayer metal membranes of the present invention.

The results shown in FIG. 2 demonstrate that the lifetime of a composite metal membrane can be improved by the presence of the non-continuous metal oxide, i.e., aluminum oxide, layer. Additionally, the flux or flow rate can be enhanced as well. The performance of a composite metal membrane without any aluminum oxide (from the comparative example) is shown at line 50 and the performance of the embodiments in examples 1 and 2 show significantly higher flow rates and lifetimes at the temperature of 450° C.

While not wishing to be bound by the present explanation, it is believed that the aspect of a non-continuous layer of a metal chalcogenide results in the hydrogen atom passing around the metal chalcogenide whereas a continuous layer would stop the flow of hydrogen. The metal chalcogenide is used to produce grain boundaries that are accessed by the hydrogen molecule but not larger molecules that may poison the surface of the catalytic metal. Further, in a composite membrane including a metal chalcogenide with an overcoat of catalytic metal, the presence of the metal chalcogenide may lead to increased surface area of the catalytic metal.

The composite metal membranes of the present invention can be used in hydrogen separation and may be also employed in hydrogen reformulation.

Although the present invention has been described with reference to specific details, it is not intended that such details should be regarded as limitations upon the scope of the invention, except as and to the extent that they are included in the accompanying claims.

What is claimed is:

1. A process for the recovery of hydrogen from a gaseous mixture comprising:
   contacting a hydrogen-containing gaseous mixture with a first side of a nonporous composite multilayer membrane including a layer of a Group IVB or Group VB metal sandwiched between two layers of a Group VIIIB metal selected from the group consisting of palladium, platinum, nickel, rhodium, iridium, cobalt, and alloys thereof and a non-continuous layer of a metal chalcogenide upon at least one layer of said Group VIII metal, said metal chalcogenide layer situated on an outer surface of said Group VIIIB metal layer where an inner surface of said Group VIIIB metal layer is on said layer of Group IVB metal or Group VB metal; and, separating hydrogen from a second side of said nonporous composite multilayer membrane.

2. The process of claim 1 wherein said contacting of said hydrogen-containing gaseous mixture with said composite metal membrane is at a pressure on the feed side of said membrane that is elevated relative to the pressure on the permeate side of the membrane.

3. The process of claim 1 wherein said two layers of a Group VIIIB metal are continuous.

4. The process of claim 3 wherein said two layers of a Group VIIIB metal are each from about 0.1 microns to about 25 microns in thickness.

5. The process of claim 4 wherein said layer selected from the group consisting of Group IVB metals and Group VB metals is from about 10 microns to about 250 microns in thickness.

6. The process of claim 1 wherein said metal chalcogenide is a metal oxide selected from the group consisting of aluminum oxide, silicon dioxide, molybdenum dioxide, and yttria-stabilized zirconia.

7. The process of claim 1 wherein said metal chalcogenide is aluminum oxide.

8. The process of claim 1 wherein said membrane further includes a third layer of a Group VIIIB metal selected from the group consisting of palladium, platinum, nickel, rhodium, iridium, cobalt, and alloys thereof situated on the membrane surface including the layer of a non-continuous layer of a metal chalcogenide.

9. A composite metal membrane comprising a first metal layer of a Group IVB or Group VB metal sandwiched between two layers of a Group VIIIB metal selected from the group consisting of palladium, platinum, nickel, rhodium, iridium, cobalt, and alloys thereof, and a non-continuous layer of a metal chalcogenide upon at least one layer of said Group VIII metal, said metal chalcogenide layer situated on an outer surface of said Group VIIIB metal layer where an inner surface of said Group VIIIB metal layer is on said layer of Group IVB metal or Group VB metal.

10. The membrane of claim 9 wherein said two continuous nonporous layers of a Group VIIIB metal are each from about 0.1 microns to about 25 microns in thickness.

11. The membrane of claim 9 wherein said metal chalcogenide is a metal oxide selected from the group consisting of aluminum oxide, silicon dioxide, molybdenum dioxide, and yttria-stabilized zirconia.

12. The membrane of claim 9 wherein said metal chalcogenide is aluminum oxide.

13. The membrane of claim 9 further including a third layer of a Group VIIIB metal selected from the group consisting of palladium, platinum, nickel, rhodium, iridium, cobalt, and alloys thereof situated on the membrane surface including the layer of a non-continuous layer of a metal chalcogenide.

14. The membrane of claim 9 wherein said first metal layer selected from the group consisting of Group IVB metals and Group VB metals is from about 10 microns to about 250 microns in thickness.

15. A process of forming a composite metal membrane comprising:

cleaning a metal film selected from the group consisting of Group IVB metals and Group VB metals to remove surface oxides and surface imperfections from the metal film;

depositing layers of a Group VIIIB metal selected from the group consisting of palladium, platinum, nickel, rhodium, iridium, cobalt, and alloys thereof upon the cleaned surfaces of said Group IVB or Group VB metal film; and, depositing a non-continuous layer of a metal chalcogenide upon at least one outer surface of a layer of said Group VIIIB metal where an inner surface of said Group VIIIB metal layer is on said layer of Group IVB metal or Group VB metal.

16. The process of claim 15 wherein said cleaning and said depositing are conducted under vacuum in a single chamber and said vacuum is maintained throughout both said cleaning and said depositing.

17. The process of claim 15 wherein said layers of a Group VIIIB metal selected from the group consisting of palladium, platinum, nickel, rhodium, iridium, cobalt, and alloys thereof are continuous.

18. The process of claim 15 wherein said metal chalcogenide is a metal oxide selected from the group consisting of aluminum oxide, silicon dioxide, molybdenum dioxide, and yttria-stabilized zirconia.

19. The process of claim 15 wherein said metal chalcogenide is aluminum oxide.

* * * * *